A. B. PARKMAN.
Hame-Fasteners.

No. 218,310.                     Patented Aug. 5, 1879.

WITNESSES:
C. Neveux
C. Sedgwick

INVENTOR:
A. B. Parkman
BY
ATTORNEYS.

UNITED STATES PATENT OFFICE.

ALBION B. PARKMAN, OF ST. ALBANS, MAINE.

IMPROVEMENT IN HAME-FASTENERS.

Specification forming part of Letters Patent No. 218,310, dated August 5, 1879; application filed April 17, 1879.

*To all whom it may concern:*

Be it known that I, ALBION B. PARKMAN, of St. Albans, in the county of Somerset and State of Maine, have invented a new and Improved Hame-Fastener, of which the following is a specification.

Figure 1:
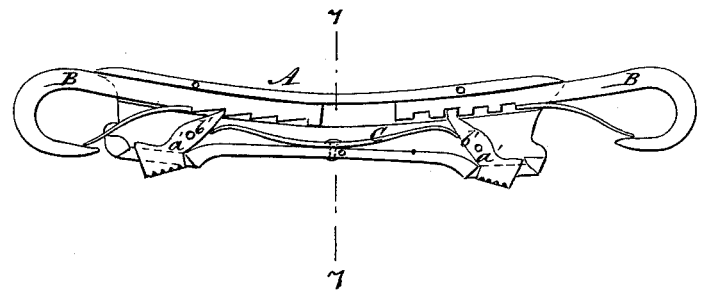
Figure 2:
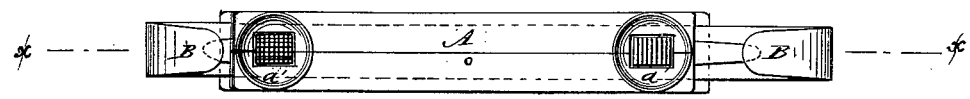
Figure 3:

Figure 1 is a longitudinal section on line $x$ $x$, Fig. 2. Fig. 2 is a plan of the device. Fig. 3 is a cross-section on line $y$ $y$, Fig. 1.

Similar letters of reference indicate corresponding parts.

The object of this invention is to furnish an adjustable hame-fastener.

The invention consists of the hollow shank or body A. The snap-hooks B B, the shank of one of which has sharp teeth on its upper face, while the shank of the other is provided with square teeth on its upper face, are to be thrust into either end of the body A and held there by the dogs $a'$ $a'$, that are pivoted, at $b'$ $b'$, within the body of the fastener, and made to engage with the teeth of the snap-hooks by the curved spring C, as shown in Fig. 1.

When it is desired to draw a hook partially or entirely out, pressure upon the dog's head that projects through a socket in the face of the body A, will release the dog from the teeth. One hook is furnished with square teeth, and the point of its dog is correspondingly shaped, so that the hook will not start out when the opposite hook is thrust in. The hook with the rectangular notches is set in the sheath or body, while the hook with acute-angled notches is withdrawn to remove the hames. The advantage of the rectangular notches is that their hook cannot be removed by pressing the other into position.

The body A of the fastener may be made of two like longitudinal pieces, bolted or pinned together, after the spring and dogs are set in their respective places; but, preferably, it is made in one piece, and the spring and dogs inserted afterward.

Having thus fully described my invention, I claim as new and desire to secure by Letters Patent—

The within-described hame-fastener, consisting of the body A, containing the dogs $a'$ $a'$, and spring C, in combination with the snap-hooks B B, one of whose shanks is provided with sharp teeth, while the other is provided with square teeth, substantially as shown and described.

ALBION B. PARKMAN.

Witnesses:
W. ROBBINS,
T. B. LUKINS.